US011456941B2

United States Patent
Mahesh et al.

(10) Patent No.: US 11,456,941 B2
(45) Date of Patent: Sep. 27, 2022

(54) EXTENSIBLE NETWORK TRAFFIC ENGINEERING PLATFORM FOR INCREASING NETWORK RESILIENCY IN CLOUD APPLICATIONS

(71) Applicant: NVIDIA Corporation, Santa Clara, CA (US)

(72) Inventors: Siddheshwar Mahesh, San Jose, CA (US); Markus Flierl, Portola Valley, CA (US); Bryan DiCarlo, Pleasanton, CA (US); Bojan Vukojevic, Pleasanton, CA (US)

(73) Assignee: NVIDIA Corporation, Santa Clara, CA (US)

( * ) Notice: Subject to any disclaimer, the term of this patent is extended or adjusted under 35 U.S.C. 154(b) by 29 days.

(21) Appl. No.: 16/938,184

(22) Filed: Jul. 24, 2020

(65) Prior Publication Data

US 2022/0029906 A1    Jan. 27, 2022

(51) Int. Cl.
| | |
|---|---|
| *G06F 15/173* | (2006.01) |
| *H04L 43/10* | (2022.01) |
| *H04L 43/12* | (2022.01) |
| *H04L 41/0893* | (2022.01) |
| *H04L 45/028* | (2022.01) |
| *H04L 47/2408* | (2022.01) |
| *H04L 43/0852* | (2022.01) |
| *H04L 45/02* | (2022.01) |
| *H04L 41/14* | (2022.01) |
| *H04L 41/046* | (2022.01) |
| *H04L 43/50* | (2022.01) |

(Continued)

(52) U.S. Cl.
CPC ............ *H04L 43/10* (2013.01); *H04L 41/046* (2013.01); *H04L 41/082* (2013.01); *H04L 41/0893* (2013.01); *H04L 41/14* (2013.01); *H04L 43/062* (2013.01); *H04L 43/08* (2013.01); *H04L 43/0852* (2013.01); *H04L 43/12* (2013.01); *H04L 43/16* (2013.01); *H04L 43/50* (2013.01); *H04L 45/028* (2013.01); *H04L 45/04* (2013.01); *H04L 47/2408* (2013.01)

(58) Field of Classification Search
CPC ..... H04L 43/10; H04L 43/0852; H04L 43/12; H04L 41/0893; H04L 41/14; H04L 45/028; H04L 45/04; H04L 47/2408
See application file for complete search history.

(56) References Cited

U.S. PATENT DOCUMENTS

| | | | | |
|---|---|---|---|---|
| 2005/0108386 | A1* | 5/2005 | Acharya | ............. H04L 12/4633 709/224 |
| 2006/0193247 | A1* | 8/2006 | Naseh | ..................... H04L 45/04 370/216 |

(Continued)

*Primary Examiner* — Richard G Keehn
(74) *Attorney, Agent, or Firm* — Taylor English Duma LLP

(57) ABSTRACT

In various examples, an extensible network traffic engineering platform monitors network traffic and application performance to dynamically update network ingress and egress communication paths for increasing performance of the application—such as a cloud gaming application, a cloud virtual reality (VR) application, and/or another high performance application types. Pluggable, distributed, application-centric network monitors, policy engines, and network configurators are implemented at the edge to detect degraded network and application performance and dynamically update network routing to account for the same.

26 Claims, 10 Drawing Sheets

(51) Int. Cl.
*H04L 41/082* (2022.01)
*H04L 43/16* (2022.01)
*H04L 43/08* (2022.01)
*H04L 43/062* (2022.01)

(56) References Cited

U.S. PATENT DOCUMENTS

2017/0250875 A1* 8/2017 Jensen ................ H04L 43/0852
2020/0067830 A1* 2/2020 Malhotra ................ H04L 45/28
2021/0211347 A1* 7/2021 Vasseur ............... H04L 43/0876

* cited by examiner

EXTENSIBLE NETWORK TRAFFIC ENGINEERING PLATFORM FOR INCREASING NETWORK RESILIENCY IN CLOUD APPLICATIONS

BACKGROUND

Network streaming applications—such as cloud gaming, cloud virtual reality (VR), remote workstation, and/or other application types—can be extremely sensitive to network performance parameters like latency, jitter, and packet loss. Network traffic routing over the Internet is generally facilitated using the border gateway protocol (BGP), but BGP is not latency, loss, or congestion aware, leading to network traffic frequently being directed over paths that are suboptimal. For example, network traffic directed over a suboptimal network path—e.g., via any number of autonomous systems (AS)—may impact the quality of an application experience, thereby reducing responsiveness of the game due to lag, latency, stutter, frame drops, and/or the like.

A conventional approach to traffic routing is multihoming with two or more different internet service providers (ISPs) such that where one ISP goes down, another ISP can be leveraged to maintain a connection. However, even with multihoming, an optimal or better path may not be selected when two or more of the ISPs are ostensibly in operation, albeit under compromised conditions. For example, some ISPs may cause network "black holes" where the ISP advertises a path to a network or AS but silently drops messages internal to the AS of the ISP when the advertised path is selected. Where a hybrid cloud is implemented—e.g., using public and private clouds—applications and services that rely on the hybrid cloud may suffer outages where these "black hole" events occur. As such, even in conventional systems that are multihomed, identification of these events may go undetected, and thus reduce the resiliency of the network.

Some conventional systems implement custom traffic engineering solutions with their individual proprietary software-defined networking (SDN) controllers. For example, monitors (or agents) may monitor network traffic to determine whether updates to network paths should be made. However, these network monitors are not application-specific, nor pluggable, thereby reducing their effectiveness and extensibility for optimizing network traffic routing on a per application basis. As a result, network traffic updates may reroute traffic in a way that may satisfy criteria of the monitors, but the criteria may actually result in a net reduction in quality of service (QoS) for specific applications due to the monitors not being tailored to process application-related data and/or make network routing updates that are advantageous for the type of application being supported.

SUMMARY

Embodiments of the present disclosure relate to an extensible network traffic engineering platform for increasing network resiliency in cloud applications. Systems and methods are disclosed that monitor network traffic and application performance to dynamically update network ingress and egress communication paths for increasing performance of an application—such as a cloud gaming application, a cloud virtual reality (VR) application, a remote workstation application, and/or other cloud, streaming, or high performance application types.

In contrast to conventional systems, such as those described above, the present systems and methods leverage pluggable, application-centric network monitors, policy engines, and network configurators for improving application performance. The monitors, policy engines, and/or network configurators may be implemented at the edge, agnostic to physical topologies of internal network, thereby enabling the present traffic engineering solution to be pluggable and customizable. For example, network monitors may be distributed across a network or in a hybrid cloud and programmed to monitor customizable network performance metrics (e.g., loss, latency, jitter, etc.) and/or application performance metrics (e.g., game stream session yield, application quality of service (QoS) metrics, etc.). The monitored data may then be used to detect degraded network performance, soft failures (e.g., "black holes"), flapping, and/or degraded application performance. These performance issues may be analyzed by policy engines customized to process outputs or determinations of associated monitors for dynamically controlling network routing with adaptive, delayed feedback mechanisms—e.g., to avoid damping by Internet service providers (ISPs), quality issues with multiple path updates over short periods, and/or the like. For example, the policy engines may compare certain network and/or application performance metrics to one or more evaluation criteria—e.g., threshold performance values of any number of alternative paths—to determine whether and/or how to update network configuration settings or criteria. Responsive to policy engine determinations, network configurators may update ingress traffic routing (e.g., prepending AS information to packet headers for penalizing suboptimal routes) and/or egress traffic routing (e.g., to update local-preference weights to direct traffic without requiring external updates to network neighbors) for dynamically reconfiguring network paths to increase performance of target applications.

BRIEF DESCRIPTION OF THE DRAWINGS

The present systems and methods for an extensible network traffic engineering platform for increasing network resiliency in cloud applications are described in detail below with reference to the attached drawing figures, wherein.

DETAILED DESCRIPTION

Figure 1:
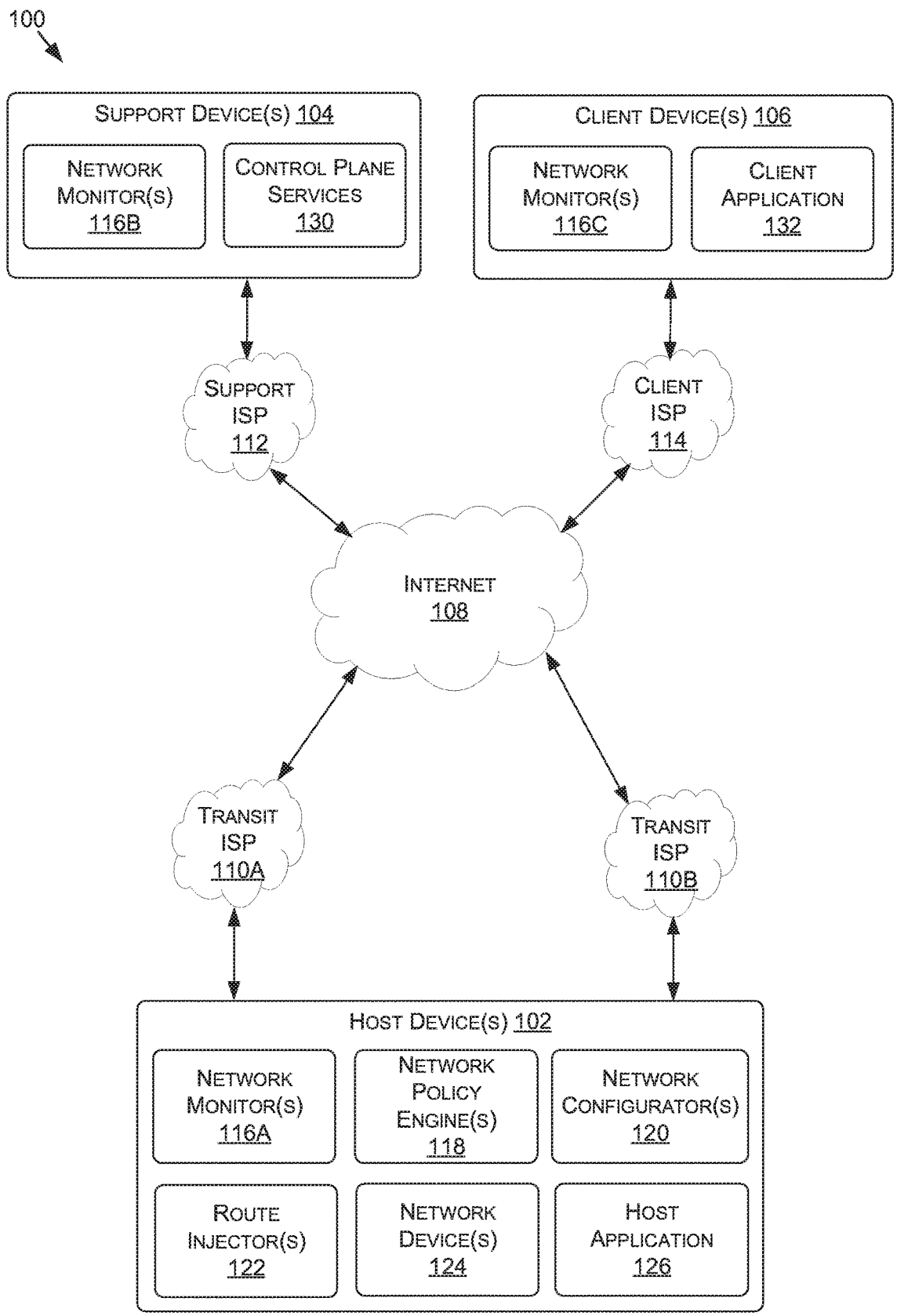
FIG. 1 is a block diagram illustrating a network traffic engineering system, in accordance with some embodiments of the present disclosure.

Systems and methods are disclosed related to an extensible network traffic engineering platform for increasing network resiliency in high performance applications. The systems and methods described herein may be implemented for any increasing network resiliency in any application type, such as, without limitation, streaming, cloud gaming, cloud virtual reality (VR), remote workstation applications, shared collaboration applications, machine learning applications, and/or other application types. For example, applications may be sensitive to various network performance parameters such as latency, loss, and/or jitter and/or application performance parameters such as session yield and/or application quality of service (QoS) metrics. As such, the system and methods described herein may be implemented in any system to increase the network and application performance for any type of application executing over a network(s)—such as the Internet. In addition, although the border gateway protocol (BGP) is primarily described herein as the protocol to which routing updates or policies are directed to, this is not intended to be limiting, and any suitable protocol may be used—e.g., the routing information protocol (RIP), secure BGP (sBGP), secure origin BGP (soBGP), etc.

In some embodiments, an extensible framework may be implemented for improving network ingress and egress path resiliency for data centers—or other backend systems—using pluggable network monitors, network policy engines, and/or network configurators. These pluggable components may be managed at the edge and, as a result, may control or manipulate network traffic agnostic to the internal network topology. The network monitors may be used to detect degraded network performance and/or application performance and feed this information to the network policy engine in a format—such as network path info (NPI) data format—understandable to the network policy engine. For example, a representational state transfer (REST) interface (e.g., API) for external monitors may be exposed by the system to allow the external monitors to publish network path information. The monitors may publish this network path information in NPI data format, and/or the information may be translated from native input format of the monitor to NPI data format. As such, any monitor may be added to the system, and may publish information in any format, and the data may be translated to a format understandable to the policy engine without requiring adjustments to the policy engine itself. The network policy engine may determine whether an update to the control policies of the system— e.g., of one or more core switches of a data center—should be updated based on the information from the network monitors. For example, the network policy engine may assess path information to evaluate network path updates (e.g., whether or not changes should or can be made), and post network policy update messages to the network configurator plugins.

In some embodiments, individual network engine monitors may correspond to individual network policy engines such that additional, updated, or new monitors may be plugged into the extensible platform at any time along with a corresponding network policy engine for updating network routing information based on an additional, updated, or new network or application parameter(s). For example, for new or different applications to be supported by the system—e.g., by a data center within the system—different network parameters and/or application parameters may be particularly important to performance of the application. As such, application specific network monitors and/or policy engines may be added to the system to increase network performance and thus application performance for the application. As a result, in some embodiments, routing policies may be updated differently for different applications supported by the system, and the different monitors, policy engines, and/or network configurators may be modified for each particular or current application executing on the system.

As further examples of the extensibility of the present system, new or different network monitors may be added to the system without requiring changes to other components of the system—such as policy engines, network configurations, network devices (switches, etc.) and/or the like. For example, because network monitors may be configured to output data to the policy engines in a common format—and using an existing REST interface, for example—these new or additional monitors may be added to the system to test network parameters without requiring a new policy engine or network configurator that corresponds individually to the monitors. In addition, in some embodiments, the extensibility and flexibility of the system may allow for new switches—or other network device types—to be supported by the system by adding a corresponding network configurator, without requiring updates or changes to network monitors and/or policy engines that communicate identified network information or policy update information to the network configurators that, in turn, update the network devices. As a result, a new switch or network device may be added to the system, and the existing network monitors and policy engines may communicate with the network configurator corresponding to the new network device to implement any changes to import or export maps, or other routing protocols of the network device.

In some embodiments, the network policy engines may take into account, even where a change to network routing information is recommended, prior updates over some time window—e.g., thirty minutes, two hours, etc. For example, to avoid dampening penalties from ISPs, the network policy engine may delete or ignore actions that would cause switching ISPs more than a threshold number of times in the time window. To avoid publishing out network updates beyond the internal network of a data center, for example, BGP local preference weights may be used to direct egress network traffic. In some examples, however, such as where incoming traffic updates are required—e.g., where a case critical destination BGP autonomous system (AS) is to be included in a network path—export route maps may be updated to control incoming traffic from outside of the internal network of a data center.

Once criteria for updating the network routing is determined—e.g., to switch from a current internet service provider (ISP) to another ISP, to update export route maps, to update import route maps, and/or other updates—this information may be sent to the network configurators in a format (e.g., network policy update (NPU) format)—understandable to the network configurators. As a result, the network configurators may determine policy updates for one or more network devices—such as switches and/or routers—and may implement the routing updates at the target network endpoints. For example, the network configurator may correspond to a core switch configurator that may be used to update a border gateway protocol (BGP) local preference value for a particular egress port of the core switch to force traffic though a particular or desired ISP. Ultimately, the network routing configurations, preferences, and/or policies may be updated to shift traffic over desired paths to increase performance of an application executing on an end-user device.

With reference to FIG. 1, FIG. 1 is an example block diagram of a network traffic engineering system 100 (alternatively referred to herein as "system 100"), in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. In some embodiments, one or more components, features, and/or functionalities of the system 100 may be similar to those of example game streaming system 700 of FIG. 7 and/or example computing device 800 of FIG. 8.

The system 100 may include one or more host devices 102, one or more support devices 104, and/or one or more client devices 106 that communicate over the Internet 108 via one or more internet service providers (ISPs), such as transit ISPs 110A and 110B, support ISP 112, and/or client ISP 114. In some embodiments, the system 100 may correspond to a cloud computing and/or a distributed computing environment. For example, where the host application 126 corresponds to a cloud gaming application, the example game streaming system 700 of FIG. 7 may include one suitable architecture or platform for supporting the cloud gaming application.

The transit ISPs 110 may provide access to the Internet (or other WAN) for the host device(s) 102, the support ISP 112 may provide access to the Internet for the support device(s) 104, and the client ISP 114 may provide access to the internet for the client device(s) 106. In some embodiments, one or more of the transit ISP 110, the support ISP 112, and/or the client ISP 114 may be a same ISP, while in other embodiments, one or more of the ISPs 110, 112, and/or 114 may differ. In addition, where more than one host device(s) 102 is implemented, different host device(s) 102 may use different transit ISPs 110, where more than one support device(s) 104 is implemented, different support devices 104 may use different support ISPs 112, and/or where more than one client device(s) 106 is implemented, different client devices 106 may use different client ISPs 114.

Although referred to as the Internet 108, this is not intended to be limiting, and the system 100 may be implemented for any network types, such as wide area networks (WANs), local area networks (PANs), other network types, or a combination thereof. Although the host device(s) 102 is illustrated as being multihomed—e.g., having two transit ISPs 110—this is not intended to be limiting, and in some embodiments, the support device(s) 104 and/or the client device(s) 106 may also be multihomed. In addition, although only a single link through each ISP is illustrated, this is not intended to be limiting, and in some embodiments an individual ISP—such as the transit ISP 110A—may include a plurality of separate routes or edge router access points or nodes for the host device(s) 102. For example, in some embodiments, when switching from one ISP to another, this may correspond to switching from a first route (e.g., via a first edge router of the ISP) through an ISP to a second route (e.g., via a second edge router of the ISP) through the same ISP.

The host device(s) 102 may host a host application 126—e.g., a high performance application, a cloud game streaming application, a virtual reality (VR) content streaming application, a content streaming application, a remote desktop application, etc.—using one or more application programming interface (APIs), for example. The host device(s) 102 may correspond to a data center, in some embodiments, such that the host device(s) 102 may include any number of sub-devices such as servers, network attached storage (NAS), APIs, other backend devices, and/or another type of sub-device. For example, the host device(s) 102 may include a plurality of computing devices (e.g., servers, storage, etc.) that may include or correspond to some or all of the components of the example computing device 800 of FIG. 8, described herein. In some embodiments, the host application 126 may execute using one or more graphics processing units (GPUs) and/or virtual GPUs to support a client application 132 executing on the client device(s) 106. In some embodiments, at least some of the processing of the host device(s) 102 may be executed in parallel using one or more parallel processing units, such as GPUs, cores thereof (e.g., CUDA cores), application specific integrated circuits (ASICs), vector processors, massively parallel processors, symmetric multiprocessors, etc. In embodiments where rendering is executed using the host device(s) 102, the host device(s) 102 may implement one or more ray-tracing and/or path-tracing techniques to increase the quality of images and/or video in a stream (e.g., where the client device 106 is capable of displaying high-definition—e.g., 4K, 8K, etc.—graphics, and/or the network characteristics currently support streaming of the same).

The host device(s) 102 may include one or more network devices 124—e.g., switches, routers, gateways, hubs, bridges, access points, etc.—that may be configured to direct traffic internal to a network of the host device(s) 102, direct incoming or ingress traffic from the Internet, direct outgoing or egress traffic to the Internet, and/or control, at least in part, routing of the network traffic through various autonomous systems of the Internet (e.g., via edge routers of the autonomous systems using the BGP protocol). For example, to direct ingress traffic from the Internet and/or egress traffic to the Internet, one or more core switches may be implemented to serve as a gateway to the Internet (and/or another WAN). The core switches may include import route maps (e.g., for egress network traffic) and/or export route maps (e.g., for ingress network traffic) that may be configured to aid in routing the network traffic coming to the host device(s) 102 and/or leaving from the host device(s) 102. In addition, the routing policies of the core switches—or other network devices 124—may include local preference values for particular egress ports and/or ingress ports that may be used by the system 100 to route traffic along a particular path (e.g., via a preferred transit ISP 110). In addition, although the network devices 124 primarily described herein are core switches, this is not intended to be limiting, and the techniques described herein for the core switches may be additional or alternatively implemented for other types of network devices 124 without departing from the scope of the present disclosure—such as distribution switches, edge switches, routers, access points, core layer devices, distribution layer devices, access layer devices, etc. In some embodiments, one or more of the network monitor(s) 116, the network policy engine(s) 118, and/or the network configurator(s) 120 may be executed or deployed on the core switches directly—e.g., where the core switches or other network device(s) 124 support containerized applications.

In order to control or manipulate the ingress and/or egress routes from the support device(s) 104 and/or the client device(s) 106, a route injector(s) 122 may update export route maps that are distributed across the Internet and/or import route maps that are locally managed such that certain network paths are favored—and thus implemented—by the host device(s) 102, the support device(s) 104, and/or the client device(s) 106. For example, for ingress traffic, the route injector(s) 122 may cause one or more autonomous system prefixes to be added, or prepended, to particular paths (e.g., using BGP headers) such that those path updates are propagated to other devices—e.g., the support device(s) 104 and/or the client device(s) 106—to influence the network paths selected by the other devices when communicating with the host device(s) 102. As such, where transit ISP 110A is currently being used, but a determination is made that transit ISP 110B has greater network and/or application performance, the export route maps may be updated to penalize transit ISP 110A (e.g., to create an appearance that a route through an autonomous system of transit ISP 110A is worse, or includes more hops) by prepending one or more additional autonomous system prefixes to the export route maps.

For egress traffic, the import route maps may be updated using local preference values to limit the number of externally visible network messages (e.g., by updating the local preference values, these updates do not need to be propagated to other devices in the system 100). As such, because import route maps are not externally visible or propagated, the parameter updates may only influence the outgoing network path for a set of network routes. For host applications 126 that largely consist of outgoing traffic—such as streaming, cloud gaming, etc.—the network quality can thus be influenced by making internal changes that are unknown to the larger network. In examples where other services executing outside of the host device(s) 102—such as control plane services 130 executing on the support device(s) 104—both the import route maps and the export route maps may be updated to influence network path selection for ingress and egress traffic to the host device(s) 102. As such, in a cloud gaming example, communication paths between the host device(s) 102 and the client device(s) 106 may be manipulated using import route map updates, while communication paths between the host device(s) 102 and the support device(s) 104—e.g., executing authentication services for the host application 126—may be manipulated by updating both import route maps and export route maps.

To make network routing decisions and updates, one or more network monitors 116A-116C, one or more network policy engines 118, and/or one or more network configurators 120 may be implemented. For example, the combination of the network monitor(s) 116, the network policy engine(s) 118, and/or the network configurator(s) 120 may correspond to a network monitoring and traffic control sub-system of the system 100. In some embodiments, the network monitor(s) 116, network policy engine(s) 118, and/or the network configurator(s) 120 may be pluggable and customizable, such that the sub-system is extensible to any number of different communicatively coupled devices (e.g., to monitor and control traffic between the host device(s) 102 and the support device(s) 104, between the host device(s) 102 and the client device(s) 106, between the host device(s) 102 and other device(s) (not illustrated), etc.), to any number of different host applications 126 (e.g., different network monitor(s) 116 and/or network policy engine(s) 118—or network policies thereof—may be programmed and plugged into the system 100 to monitor and control traffic to increase network and/or application performance for specific applications), to any number of different network parameters and/or application parameters, or a combination thereof. For example, when creating new network monitor(s) 116, the network policy engine(s) 118, and/or the network configurator(s) 120, the target devices or autonomous systems may be determined, the network and/or application performance metrics associated with the communications there between may be determined, actionable thresholds may be determined, and policy updates may be determined for when thresholds are reached or exceeded. As such, with these criteria in mind, additional, application-centric network monitor(s) 116, network policy engine(s) 118, and/or network configurator(s) 120 may be implemented in the system 100.

For example, in some embodiments, the network monitor(s) 116, network policy engine(s) 118, and/or the network configurator(s) 120 may correspond to containerized applications or services—or instances thereof. As such, the sub-system may allow for selection, organization, and deployment (e.g., using virtual machines (VMs) within the host device(s) 102) of containers in network and/or application performance monitoring and traffic routing pipelines. The deployed containers may host instantiations of the network monitor(s) 116, the network policy engine(s) 118, and/or the network configurator(s) 120. For example, images of the network monitor(s) 116, the network policy engine(s) 118, and/or the network configurator(s) 120 (e.g., container images) may be available in a container registry, and once selected—e.g., by a user, automatically, etc.—for deployment in a pipeline, the image may be used to generate a container for an instantiation of the network monitor(s) 116, the network policy engine(s) 118, and/or the network configurator(s) 120. For example, a first network monitor 116 may be suitable for a first type of application that requires very low latency, while a second network monitor 116 may be more suitable for a second application type that requires low packet loss but where latency is not as much of a concern. As such, when configuring the system 100 for the first type of application, the first network monitor 116 may be instantiated—in addition to a network policy engine(s) 118 and/or a network configurator(s) 120, in embodiments—to aid in configuring network routing such that latency is decreased. In the same example, when configuring the system 100 for the second type of application, the second network monitor 116 may be instantiated—in addition to a network policy engine(s) 118 and/or a network configurator(s) 120, in embodiments—to aid in configuring network routing such that packet loss is decreased, even if latency is increased. As a result, each type of application may perform as desired, providing favorable user experiences, whereas, if traditional fixed, application agnostic network monitoring were performed, at least one of the application types would suffer from network and/or application performance issues.

In some embodiments, to allow for seamless communication between pluggable and/or containerized instances of the network monitor(s) 116, the network policy engine(s) 118, and/or the network configurator(s) 120, data generated by each of the components of the sub-system may be formatted—e.g., initially, or after translation from a native format—such that a next component of the sub-system understands and is able to digest the data. In addition, in some embodiments, the sub-system including the network monitor(s) 116, the network policy engine(s) 118, and/or the network configurator(s) 120 may include two or more instantiations at any one time on different VMs hosted by different computing devices (e.g., servers) within the host device(s) 102 for high availability (HA), clustering, and/or redundancy. As a result, a single node may be removed as a point of failure of the sub-system, such that software crashes, hardware faults or failures, and/or other issues may not prevent the network monitoring and control of the sub-system from being executed. In some examples, the instances of the network monitor(s) 116, the network policy engine(s) 118, and/or the network configurator(s) 120 may be stateless such that default network configuration and/or policies, and/or updated network configurations and/or policies may be read from a configuration service, and a current state of the sub-system may be stored in another application or service instance (e.g., a distributed, wide column store, non-relational structured query language (NoSQL) database management service). In some examples, the monitoring updates and/or policies may be stored in different key value stores or time series databases. In addition, the location of a data store—or database—storing this information may be located on the host device(s) 102 and/or the support device(s) 104. In some examples, such as where the host device(s) 102 are data centers, the data store may reside on the support device(s) 104 as a global data store accessible by each host device(s) 102. In other examples, the data store may reside on the host device(s) 102 to provide local access to network and/or application performance metrics and/or to the history of the network policy updates—e.g., specific to that host device(s) 102.

The network monitor(s) 116 may monitor network and/or application performance using network performance metrics (e.g., latency, loss, jitter, cost associated with different transit ISPs 110, capacity associated with different transit ISPs 110, etc.) and/or application performance metrics (e.g., streaming session yield, application QoS metrics, etc.) as inputs. These inputs may be determined by transmitting test probes (e.g., pings) and/or simulating application specific network traffic between and among the network monitor(s) 116, and analyzing the resulting communications to determine the network and/or application performance metrics. For example, a REST interface (e.g., API) may be exposed to enable the network monitor(s) 116 to publish network path information such as an actual path information (e.g., which autonomous systems are configured for communication with other autonomous systems), network performance metrics (and/or data that may be analyzed to determine the same), and/or application performance metrics (or data that may be analyzed to determine the same).

The network monitors 116 may be distributed within the system 100 depending on the type of network traffic information and/or the devices that the network traffic is to be monitored between. As such, the network monitors 116 may include network monitors 116A executing on the host device(s) 102 (e.g., for monitoring egress and/or ingress traffic between the host device(s) 102 and the support device(s) 104 and/or the client device(s) 106, for communicating information back to the network monitors 116B and/or 116C, etc.), network monitors 116B executing on the support device(s) 104 (e.g., for testing traffic between the support device(s) 104 and the host device(s) 102 and/or the client device(s) 106, for communicating information back to the network monitors 116A and/or 116C, etc.), and/or network monitors 116C executing on the client device(s) 106 (e.g., for testing traffic between the client device(s) 106 and the host device(s) 102 and/or the support device(s) 104, for communicating information back to the network monitors 116A and/or 116B, etc.). In some embodiments, a single network monitor 116 may be split among two or more of the host device(s) 102, the support device(s) 104, and/or the client device(s) 106. For example, a first portion of a network monitor 116 may execute on the host device(s) 102 and a second portion may execute on the support device(s) 104, and communications may be exchanged between the two for monitoring various network paths and testing end-to-end network and/or performance metrics of the same.

The network monitor(s) 116 may publish the network path information in a network path information (NPI) data format and/or may use specific plugins hosted by the sub-system and corresponding to the network monitor(s) 116 to translate native inputs (e.g., native network path information) into the NPI data format. This published information in NPI data format may be assessed by the network policy engine(s) 118 to evaluate a current network path, other potential network paths, and/or application and/or network performance metrics corresponding to the same, and to determine whether and what type of network path updates should be implemented.

Once an updated is determined, the changes in network routing may be published or posted as messages in network policy update (NPU) data format—e.g., after translation from a native format, in embodiments—to the network configurator(s) 120. The network configurator(s) 120 may implement the routing updates on target network endpoints (e.g., network device(s) 124), such as by updating import route maps and/or export route maps of core switches (e.g., by updating local preference values for a particular egress port and/or prepending autonomous system prefixes to export route maps for controlling ingress traffic using the route injector(s) 122).

In some embodiments, the monitoring path information, the monitoring updates, and/or the control policies may be stored on the host device(s) 102 and/or the support device(s) 104. For example, the information may be stored in the support device(s) 104 as a single point of access by the host device(s) 102

Figure 2:
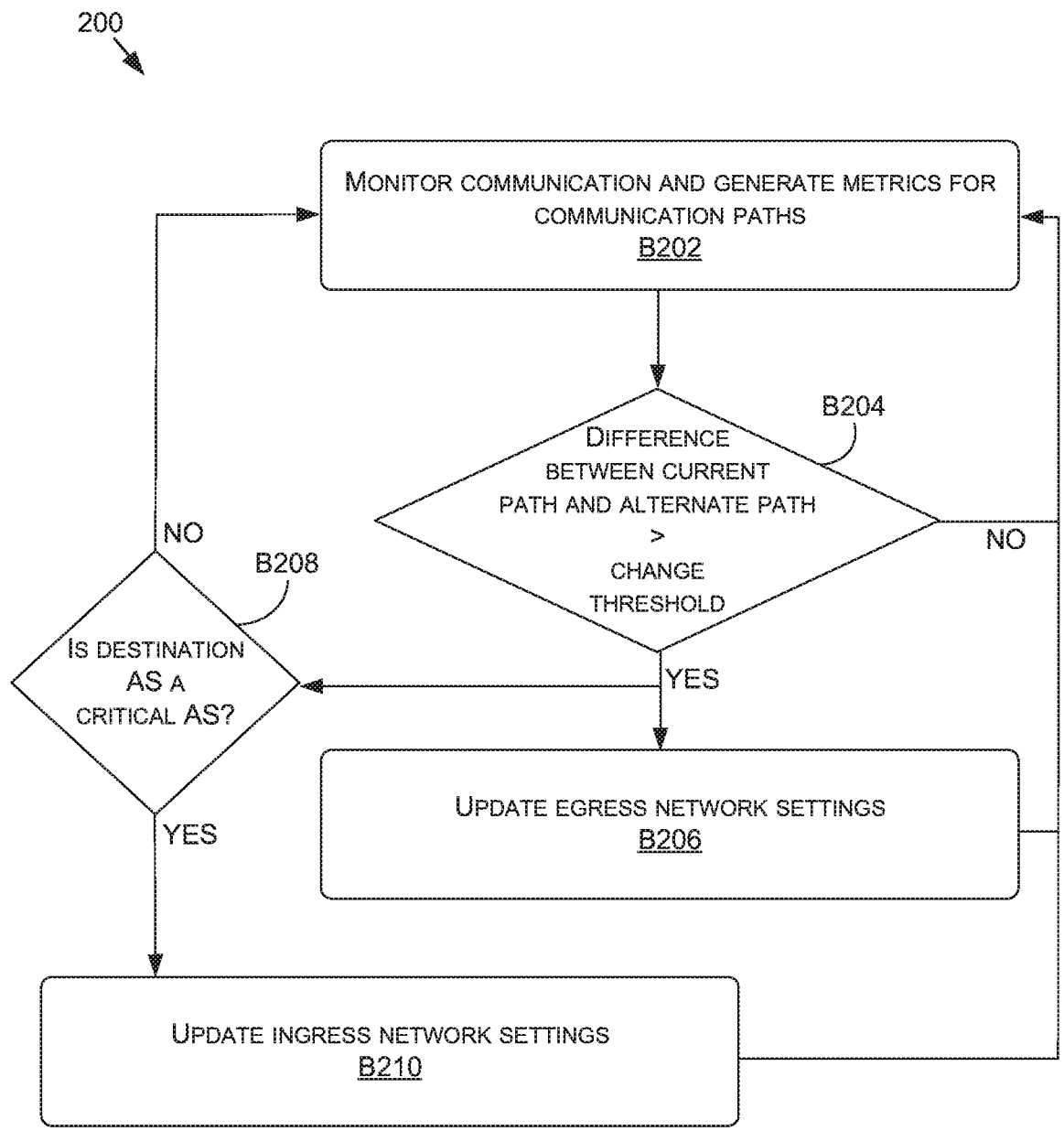
FIG. 2 is a flow diagram showing a method for updating network settings based on metrics for a plurality of communication paths, in accordance with some embodiments of the present disclosure.

Now referring to FIG. 2, each block of method 200, described herein, comprises a computing process that may be performed using any combination of hardware, firmware, and/or software. For instance, various functions may be carried out by a processor executing instructions stored in memory. The method 200 may also be embodied as computer-usable instructions stored on computer storage media. The method 200 may be provided by a standalone application, a service or hosted service (standalone or in combination with another hosted service), or a plug-in to another product, to name a few. In addition, method 200 is described, by way of example, with respect to the system 100 of FIG. 1. However, this method may additionally or alternatively be executed by any one system, or any combination of systems, including, but not limited to, those described herein.

FIG. 2 is a flow diagram showing a method 200 for updating network settings based on metrics for a plurality of communication paths, in accordance with some embodiments of the present disclosure. The method 200, at block B202, includes monitoring communication and generating metrics for communication paths. For example, the network monitor(s) 116 may monitor network paths—including different transit ISPs 110—and may generate network and/or application performance metrics. In non-limiting examples, the monitoring may include transmitting application specific traffic across the various communication paths—e.g., transmitting data representative of a 4K video stream and a high definition audio stream between the host device(s) 102 and the client device(s) 106, transmitting authentication requests between the host device(s) 102 and the support device(s) 104, etc. As another example, the monitoring may include transmitting probes or pings (e.g., from the support device(s) 104 to the host device(s) 102) to determine states of the transit ISPs 110A and 110B, and monitoring for state changes over time.

The method 200, at block B204, includes evaluating whether a difference between a current communication path and an alternate communication path is greater than a change threshold. For example, the network path information corresponding to a current network path including the transit ISP 110A may be compared—e.g., by the network policy engine(s) 118—to network path information corresponding to an alternate network path including the transit ISP 110B to determine a difference in one or more of network and/or application performance metrics. Where the determination at block B204 is that the difference—e.g., a weighted total difference of two or more metrics, in embodiments—is not greater than a change threshold, the method 200 may return to block B202 to continue monitoring.

Where the determination at block B204 is that the difference is greater than a change threshold, the method 200 may continue to block B206 to update egress network settings. For example, the network policy engine(s) 118 may determine that the updates need to be made, and this information may be used by the network configurator(s) 120 to generate and push routing update information to the network device(s) 124 (e.g., to update import route maps for egress traffic).

In some examples, such as where critical services—e.g., the control plane services 130—are part of the control plane, but execute outside of the host device(s) 102, two-way communication may be required. As a result, the autonomous system hosting these services may be classified as critical or special destination autonomous systems (e.g., BGP destination autonomous systems). In such examples, the method 200 at block B204 may continue to block B208 to determine whether a destination autonomous system is a critical autonomous system. Where it is determined that the destination autonomous system is not critical, the method 200 may proceed to block B202 to continue monitoring.

Where it is determined, at block B208, that the destination autonomous system is critical, then, in addition to or alternatively from the updates at block B206, the method 200 may proceed to block B210 to update ingress network settings. For example, the network policy engine(s) 118 may determine that the updates need to be made, and this information may be used by the network configurator(s) 120 to generate and push routing update information to the network device(s) 124 (e.g., to update export route maps by prepending autonomous system prefixes to penalize the current network path including the transit ISP 110A such that the support device(s) 104 uses the alternate network path including the transit ISP 110B to communicate with the host device(s) 102).

Referring again to FIG. 1, the support device(s) 104 may include one or more computing devices—e.g., a data center, or computing devices such as servers, NAS, APIs, etc. thereof—that host web services, such as the control plane services 130. For example, the support device(s) 104 may execute the control plane services 130—e.g., for a hybrid cloud platform—that may enable communication of information corresponding to the network and/or applications between the host device(s) 102 (e.g., a plurality of data centers) and the support device(s) 104 (e.g., one or more data centers hosting the control plane service(s) 130). In some examples, the control plane services 130 may include service discovery for determining where upstream/backend service instances are available, health checking for whether upstream service instances returned by the service discovery are healthy (e.g., including active pings and/or passive health checking), routing, load balancing, authentication and authorization (e.g., to determine, for incoming requests, if the caller can be cryptographically attested, if the caller is allowed to invoke the requested endpoint and/or if an authenticated response be returned), and/or observability (e.g., for each request, detailed statistics, logging, and distributed tracing data may be generated so that the network monitors 116 may understand the distributed traffic flow and debug issues as they occur).

The client device(s) 106 may include one or more end-user device types, such as a smartphone, a laptop computer, a tablet computer, a desktop computer, a wearable device, a game console, a smart-home device that may include an AI agent or assistant, a virtual or augmented reality device or system, and/or another type of device. In some examples, the client device(s) 106 may include a combination of devices (e.g., a smartphone and a communicatively coupled smart watch or other wearable device), and the client applications 132 associated therewith, including interactions with the host application 126, may be executed using one or more of the devices (e.g., smartphone application pushes notification to smartwatch application, user provides input to smartwatch, data representative of input is passed to another device of the system 100 via the smartphone).

Figure 3A:
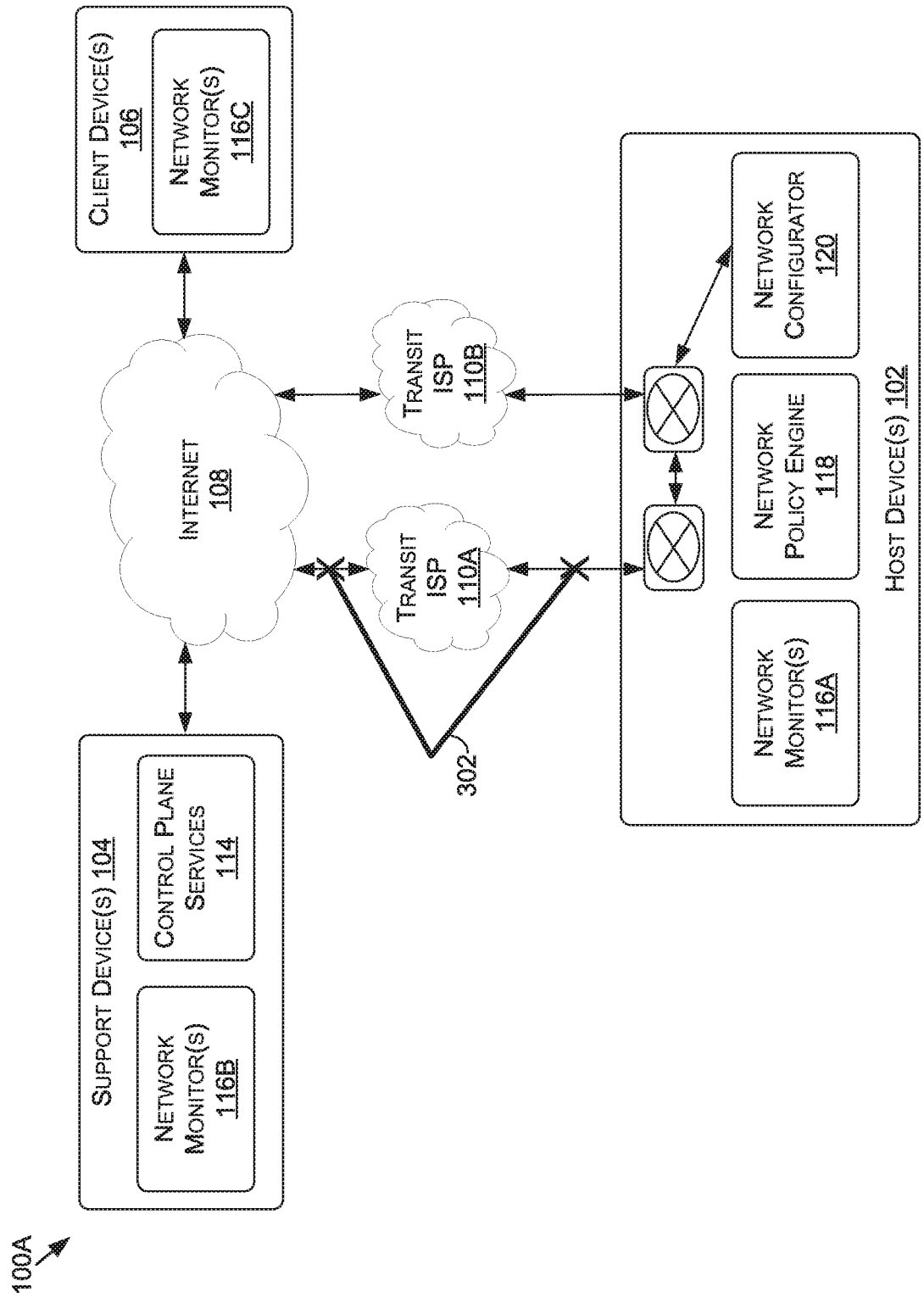
FIGS. 3A-3C depict example illustrations of network routing issues causing application or network performance degradation, in accordance with some embodiments of the present disclosure.
Figure 3B:
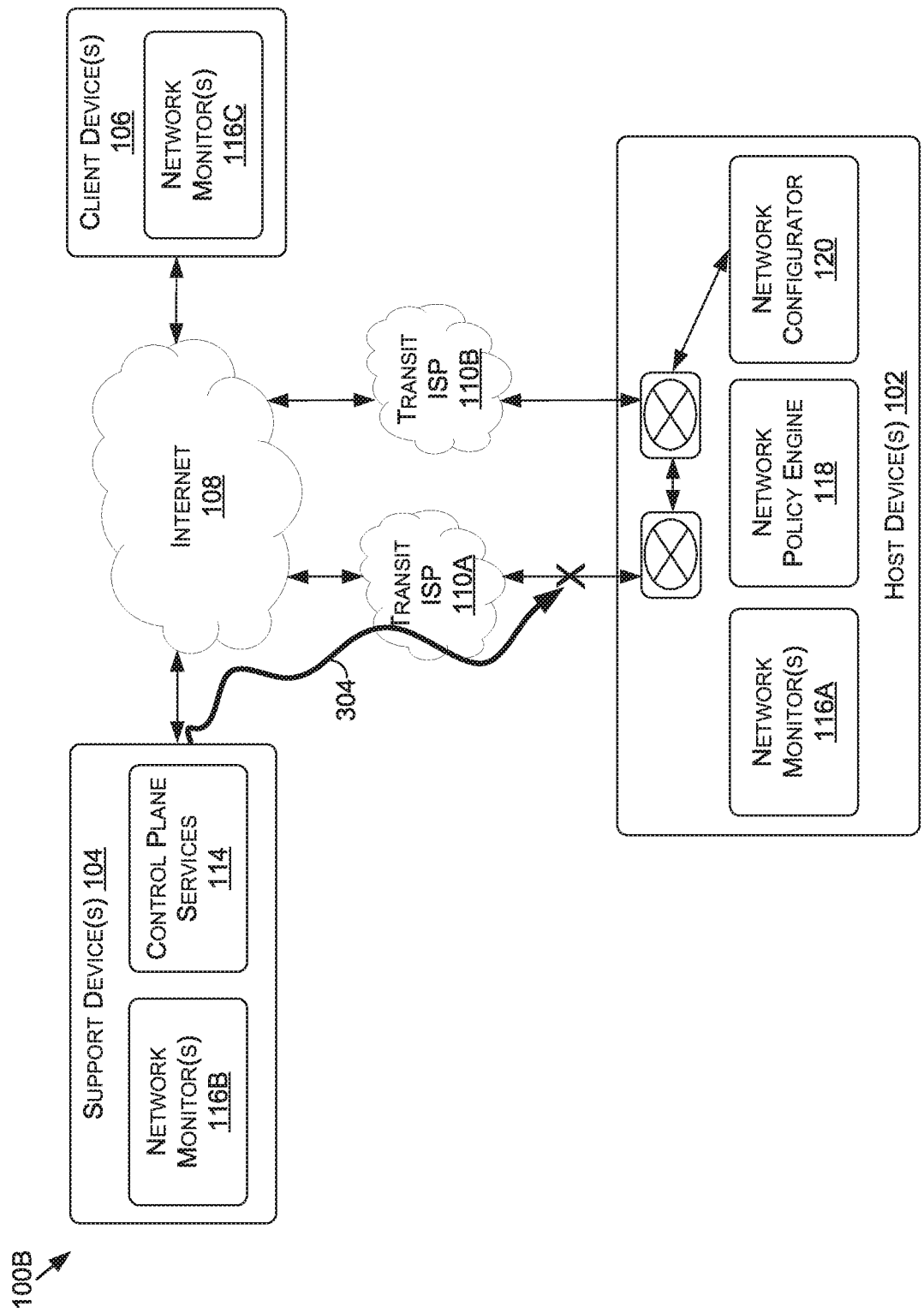
Figure 3C:
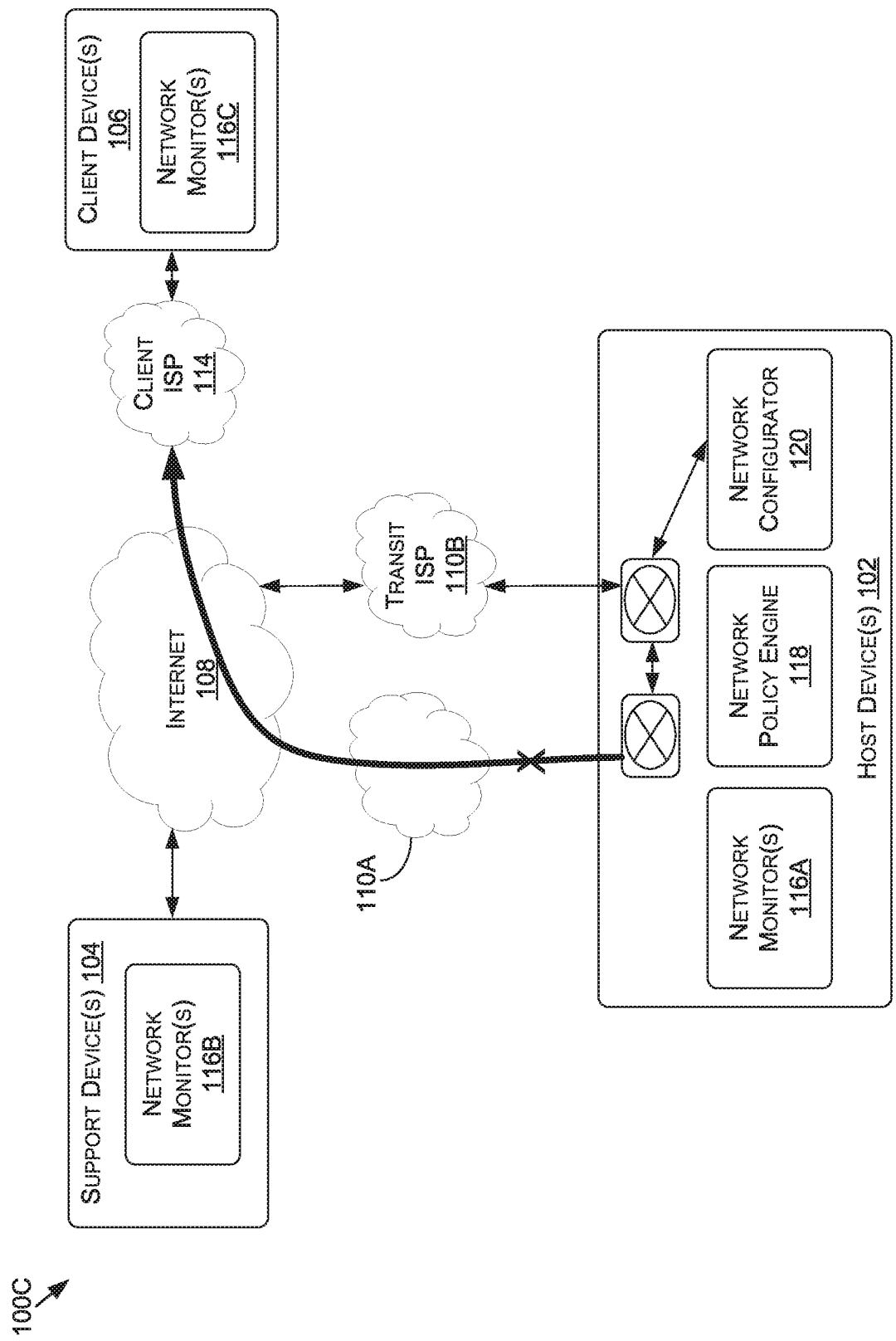

Now with reference to FIGS. 3A-3C, FIGS. 3A-3C depict example illustrations of network routing issues causing application or network performance degradation, in accordance with some embodiments of the present disclosure. For example, the network performance and/or application performance issues illustrated in FIGS. 3A-3C may be described with respect to network monitors 116, network policy engines 118, and/or network configurators 120 that may have been customized to solve the particular issues for the particular applications. The examples of FIGS. 3A-3C are not intended to be limiting, and describe suitable examples for implementing the system 100 of FIG. 1.

Referring to FIG. 3A, FIG. 3A may correspond to an example where accessibility of the host device(s) 102 to the support device(s) 104 hosting critical shared services—such as the control plane services 130—is monitored for "black hole" routing or network drops across various transit ISPs 110. For example, there are network routing anomaly incidents where a given transit ISP 110 advertises routes to a given destination autonomous system (e.g., to the support device(s) 104, or an autonomous system that also advertises a route to the support device(s) 104), but silently drops the network traffic due to internal routing issues of the autonomous system of the transit ISP. These types of incidents may have a wide impact radius in the network as multiple zones with the same transit IP provider may be impacted. This may cause issues, especially for hybrid cloud environments, where ensuring network resiliency is crucial to guarantee network connectivity to critical network services running in different clouds.

For example, soft failures 302 (e.g., "black hole" events, network drops, etc.) in transit ISP 110A may cause the control plane services 130 to become unreachable to a subset of services executing on the host device(s) 102. To overcome this failure, the soft failures may be monitored for and detected by the system 100, and the traffic may be routed away from the transit ISP 110A to, for example, the transit ISP 110B. As such, network monitors 116A and 116B may be installed and/or instantiated on the host device(s) 102 and the support device(s) 104, respectively. Tests may be executed to probe several critical network target agents deployed in different networks, and the quality of the network end-to-end may be monitored using the network monitors 116A and 116B. These individual test probes or pings may be forced over specific egress paths that include the transit ISP 110A using a combination of edge switch routing configuration (e.g., configuring the export route maps) and test protocol parameters (e.g., internet protocol (IP) differentiated services code point (DSCP)). The test probes or pings may also be separately forced over other network paths, such as via the transit ISP 110B, in order to test other end-to-end network paths between the host device(s) 102 and the support device(s) 104. The quality of the network from end-to-end, as determined via the test probes, may be evaluated based on network performance metrics such as loss, latency, jitter, and/or other performance measures. Alerts may then be set up for specific thresholds—e.g., individual metric thresholds, combinations of metrics thresholds, weighted combinations of metrics thresholds, etc., as described in more detail herein.

The network monitor(s) 116A and/or 116B may monitor for alerts over different network paths for ingress and/or egress traffic—e.g., a first network path including the transit ISP 110A and a second network path including the transit ISP 110B. The metrics and alerts may be aggregated by the network monitors 116 across different tests (e.g., jitter networks tests, latency network tests, loss network tests, etc., where different test types may be executed for different metric analysis) and different network paths, and the lists of alerts may be submitted or published by the network monitors 116. In some embodiments, the alerts may include metrics for good network paths and bad network paths, so that the network policy engine 118 may analyze not only the issues with the network path including the transit ISP 110A, but also the network path including the transit ISP 110B to determine whether a change threshold has been met (e.g., as described at block B204 of the method 200 of FIG. 2). The network policy engine 118 may then determine whether a change or update should be published or transmitted based on configurable network monitor specific policies. When a change is to be made, the network policy engine 118 may generate network route updates (e.g., in NPU data format) that may be pushed to or sent to the network configurator 120 (which may be configurable network monitor specific configurators), and the network configurator 120 may update the policies on the network device(s) 124 (e.g., by updating import route maps, updating export route maps, updating other policies, or a combination thereof).

As an example, it may be determined based on the test probes that a network path between the support device(s) 104 from the host device(s) 102 using the transit ISP 110A has a failure. An alert(s) may be generated by the network monitors 116A and/or 116B, and the network policy engine 118 may prepare updated policies based on the alert(s). In addition, the network policy engine 118 may insert the alert event in persistent storage, and mark the activity as "in progress." The network configurator 120 may update policies on the network device(s) 124—e.g., the core switches—based on the alert(s) and may update the alert event state in the persistent storage to "completed," and "active," (which may be used by the network policy engine 118 to determine if other updates should be made or not, in order to not issue too many updates in a short period of time that may cause dampening thresholds of the transit ISPs 110). As a result, the traffic to and/or from the support device(s) 104 may be routed through transit ISP 110B and away from transit ISP 110A—to avoid the soft failures of the transit ISP 110A discovered by the test probes.

For the network policy engine 118 in this example, there may be specific policy rules for actions taken for the specific network monitors 116A and/or 116B that test for soft failures. In addition, the network policy engine 118 may implement dynamic adaptive control for alerts, and may include support for auto-deletes. In some examples, the adaptive behavior may be fine-tuned or customized for specific network monitors 116 with configurable thresholds. The network monitor 116A and/or 116B of this example may include an active event state and an implicit clear event state (e.g., the network monitor 116 may rely on an alerts list API, and lack of an alert event-ID in the periodic alerts push may imply that the alert is or should be cleared—and/or removed from the persistent state store). An alert event may be considered actionable where the network performance metrics (e.g., jitter, latency, loss, and/or other metrics) for a first network path are worse than a second network path, and/or the second network path has performance metrics above a threshold. A path for this network monitor may be defined as, without limitation, {destination autonomous system, transit ISP autonomous system, egress local-IP, path name}.

Considering an implementation including the transit ISP 110A and the transit ISP 110B between the host device(s) 102 and the support device(s) 104, a first alert may be generated for a network path including transit ISP 110A. As a result, the routing preference may be switched to a network path including transit ISP 110B, and the first alert history may be recorded for transit ISP 110A for future flap detection.

A second alert may be generated after the first alert for the network path including the transit ISP 110B while the first alert is still active, or after the first alert was recently cleared (e.g., the alert history may be maintained for some period of time after clearing, such as thirty minutes). As a result, the network policy engine 118 may detect the potential side effects of the first alert action, and the prior changes for the first alert may be undone such that the network path including the transit ISP 110A may be preferred again.

As another example, assuming a switch has been made due the first alert (and assuming the second alert did not happen), and then the first alert clears (e.g., implicitly, as described herein), the route changes may be undone such that the network path including the transit ISP 110A may be favored. An alert history may also be recorded for the transit ISP 110A for future flap detection.

Assuming that another alert is active for a network path including the transit ISP 110A within some time threshold—e.g., fifteen minutes, thirty minutes, etc.—of a second alert clear for the same path, a potential flap may be detected. As a result, the system 100 may update the route preferences to favor the transit ISP 110B, and no further clearing of alerts that would revert to network paths including the transit ISP 110A may be allowed without a manual clearing of the alert. As such, the system may be used to ensure that there are not more than two path changes in the threshold period of time.

As another example, where alerts are submitted on network paths including transit ISP 110A and transit ISP 110B in a single alerts listing, the alerts may be logged, but no routing update events may be executed.

In some examples, such as where there are more than a threshold number (e.g., four, five, ten, etc.) of alerts active and/or cleared for a given transit ISP 110 within a threshold amount of time (e.g., twelve hours, twenty-four hours, etc.) for a special autonomous system (e.g., of the support device(s) 104) that cause export route maps to be updated and visibly pushed out to the network, an error may be logged and ignored to avoid black-listing and/or dampening by the transit ISPs 110. In examples where a threshold number of alerts for a network path between the host device(s) 102 and the client device(s) 106, these limits may not be enforced as only import maps may be updated that are local to the network of the host device(s) 102 and are not externally visible.

Various thresholds may be used for different network performance metrics. For example, in order to generate an alert, various threshold may be used and, once an alert is generated, difference or change thresholds (e.g., between a current alerted path and an alternate network path) may be considered to determine whether an update is to be made. For an alert to be generated, the thresholds may have to be met a certain number of times (e.g., two, three, four, etc.) within a threshold amount of time (e.g., one minute, two minutes, four minutes, etc.). With respect to alert thresholds, latency alerts may be generated at greater than 50 ms, 60 ms, etc. for intracontinental traffic, and greater than 100 ms, 200 ms, etc. for inter- or transcontinental traffic. Similarly, for packet loss, a loss alert may be generated for loss greater than five percent, ten percent, fifteen percent, etc. With respect to change thresholds, and in particular packet loss as an example, a network path may be considered worse if the percentage of packet loss is at least five percent greater than an alternate network path. As such, if the loss on the network path including the transit ISP 110A is twenty percent, then the network path including the transit ISP 110B may be considered better if the loss is less than or equal to fifteen percent. As another example, for latency, a network path may be considered worse if the percentage of latency is at least ten percent greater than an alternate network path. As such, if the latency on the network path including the transit ISP 110A is 80 ms, then the network path including the transit ISP 110B may be considered better if the latency is less than or equal to 72 ms. For a further example, for jitter, a network path may be considered worse if the percentage of jitter is at least ten percent greater than an alternate network path.

In some embodiments, to determine whether a network path is worse than another—e.g., a difference is beyond a change threshold—two or more metrics may be analyzed and weighted. For example, between latency, loss, and jitter, loss may be weighted more heavily than jitter, and jitter may be weighted more heavily than latency. That is, a path with eighty percent loss and 10 ms latency may be considered worse than a path with sixty percent loss and 50 ms latency.

Considering an example scenario, where alerts have been generated for three network paths, L1, L2, and L3. L1 may include 20% loss, 10 ms latency, and 5 ms jitter, L2 may include 10% loss, 20 ms latency, and 6 ms jitter, and L3 may include 12% loss, 22 ms latency, and 4 ms jitter. In such an example, L3 and L2 may be better routes than L1 for loss, and between L3 and L2, L2 loss is five percent better than L3. As such, L2 may be the best network path.

Considering another example scenario, L1 may include 20% loss, 10 ms latency, and 5 ms jitter, L2 may include 12% loss, 20 ms latency, and 6 ms jitter, and L3 may include 12% loss, 22 ms latency, and 4 ms jitter. In such an example, L3 and L2 may be better routes than L1 for loss, L3 and L2 may have equal loss, and L3 has the best jitter and only 10% latency. As such, L3 may be the best network path.

With reference to FIG. 3B, a network monitor(s) 116, network policy engine(s) 118, and/or network configurator(s) 120 may be implemented for detecting a class of network failures including link flapping or failover traffic. For example, within the transit ISP 110 network or at the network edge between the transit ISP 110 and the host device(s) 102, transient failures may repeat within a short period of time—referred to as link flapping. This may be different than a hard port failure that can be handled at lower layers of network protocols, and also has a much larger impact on application network performance. For example, link flapping may lead to streaming failures as traffic switches between network paths. As such, a network monitor(s) 116 may be installed outside of the network of the host device(s) 102—such as the network monitor 116B and/or 116C—to monitor for link flapping by executing periodic pings 304 of the interface (e.g., from outside of the network, such as from different regions of the support device(s) 104). When reachability of the interface changes state more than a threshold number of times within a specific interval, an alert may be generated and stored in persistent store. The network policy engine(s) 118 may receive the alert (e.g., in NPI data format) and determine a policy update that switches traffic away from the network path(s) that include the transit ISP 110 experiencing the link flapping.

The network monitor 116B and/or 116C of this example may include a maintenance active event state and a delete of alert event state issued on correction. When a maintenance active event state exists in persistent store, the system 100 may update network policies—e.g., of the network device(s) 124—to secondary mode shifting traffic (e.g., ingress and/or egress) away from network paths including the transit ISP 110 with link flapping. For example, the import route maps and/or export route maps may be updated from current route maps to updated or secondary route maps. In addition, once the link flapping has ceased (e.g., after testing over a period of time), the alert may be deleted, and the updates to the import route maps and/or the export maps may be undone to revert back to the initial or default maps.

For example, the network monitor 116 may monitor for state changes on a link, where a state change corresponds to a link going from pingable to not pingable. For example, a threshold number of state changes may have to occur over a period of time to generate an alert. The threshold may include two, three, five, etc. state changes over a half, one, two, three, etc. hour time period. As a non-limiting example, a link that goes down twice and comes back up each time within a two hour window may be flagged as flapping, and an alert may be generated.

Now referring to FIG. 3C, a network monitor(s) 116, network policy engine(s) 118, and/or network configurator(s) 120 may be implemented for monitoring session yields per transit ISP 110. The session yields may correspond to a percentage of successful application sessions that did not fail or experience another error due to networking issues. Internal network quality issues for transit ISPs 110 may adversely affect performance of an application—such as cloud gaming application, a VR streaming application, and/or other high performance applications. To address this issue, the host device(s) 102 may switch from a current transit ISP 110 to another transit ISP 110 based on application session performance monitored by the network monitor(s) 116. As such, if the application performance falls below a threshold, and the performance over another transit ISP is better, the session yield network monitor 116 may submit an alert to switch network traffic to a network path that includes the better performing transit ISP 110. In some embodiments, the application performance metrics may be queried from application streaming metrics by the network monitor(s) 116.

The network monitor(s) 116 of this example may include an active event state. When an active event state exists in persistent storage, the system 100 may update network policies—e.g., of the network device(s) 124—to secondary mode shifting traffic (e.g., ingress and/or egress) away from network paths including the transit ISP 110 with low session yield, QoS, or other application performance issues. For example, the import route maps and/or export route maps may be updated from current route maps to updated or secondary route maps.

For example, the network monitor(s) 116 may monitor for a threshold number of sessions on a transit ISP (e.g., 50, 80, 100, etc.), and may consider a threshold session yield of the sessions (e.g., less than 70%, 80%, etc.). As such, an alert may be generated where the threshold session yield is less than a threshold value and the number of sessions is greater than a threshold number. Once an alert is generated, the network policy engine(s) 118 may determine whether the alert is actionable based on comparing the current network path to another network path including a different transit ISP 110. For example, if the difference between a current network path and an alternate path is greater than a change threshold (e.g., 5%, 10%, etc.), updates may be pushed to the network device(s) 124 to update export route maps and/or import route maps.

For example, where session yields across all sessions over a period of time (e.g., thirty minutes, one hour, etc.) of transit ISP 110A are less than 80%, transit ISP 110B has greater than 90% session yield over the period of time, and there are at least one-hundred sessions of each transit ISP, the policies may be updated to favor transit ISP 110B.

As other non-limiting examples, and in addition to the network monitors 116, the network policy engines 118, and the network configurators 120 of FIGS. 3A-3C, there may be network monitors 116, network policy engines 118, and/or network configurators 120 for transit ISP 110A/110B testing for specific client ISPs 114. For example, some transit ISPs 110 may have poor connectivity with certain client ISPs 114 and, as a result, the system 100 may be used to determine whether—even though a current ISP 110 may not be experiencing any issues—the current transit ISP 110 has a poor connection with the client ISP 114, and a switch may be caused as a result. As another example, there may be network monitors 116, network policy engines 118, and/or network configurators 120 for per client ISP 114 traffic optimizations over transit ISPs 110. For example, exploratory and exploitation models may be generated based on application session data, and improvements in network performance may be monitored for. The client ISPs 114 may then be routed over specific transit ISPs 110 to improve the network quality and the user experience.

In some embodiments, network monitors 116 may have alert conditions that are transient and repeat multiple times in a very short period of time. To prevent the sub-system from making frequent network path changes, there may be a configurable delete delay parameter per network monitor 116. The delete delay parameter may revert or delay deletions of the network path changes for a period of time (e.g., twenty minutes, thirty minutes, etc.). Any further alerts during this period may reset the timer. In some examples, the network monitors 116 (e.g., the session yield network monitor) may have no way to check themselves and delete alerts once the traffic is moved out from a particular path after an alert. In such examples, the sub-system may support a configurable auto-delete parameter that may delete alerts after a specific configurable time period.

Figure 4:
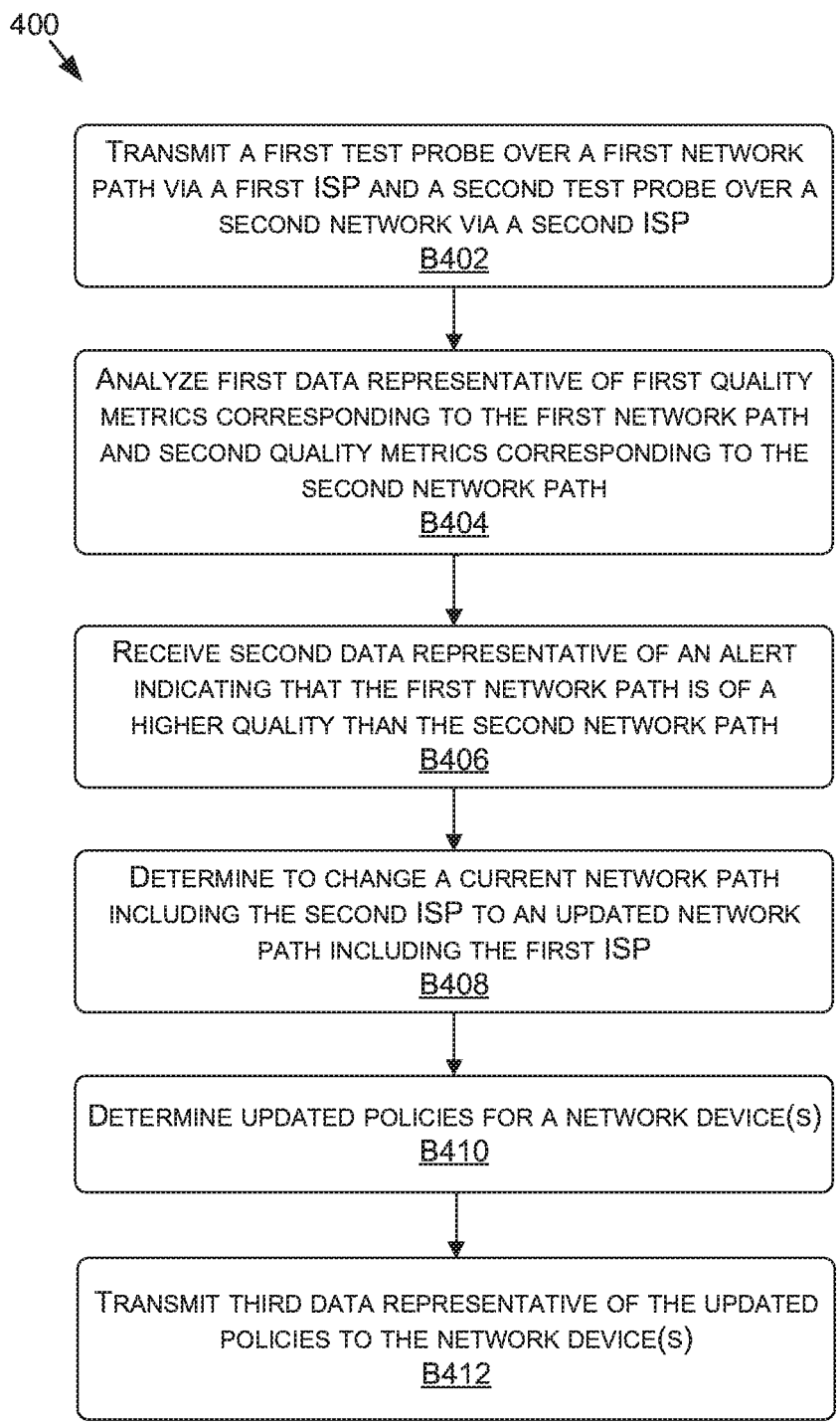
FIGS. 4-5 are flow diagrams showing methods for updating network traffic routing based on monitored network performance parameters, in accordance with some embodiments of the present disclosure.
Figure 5:
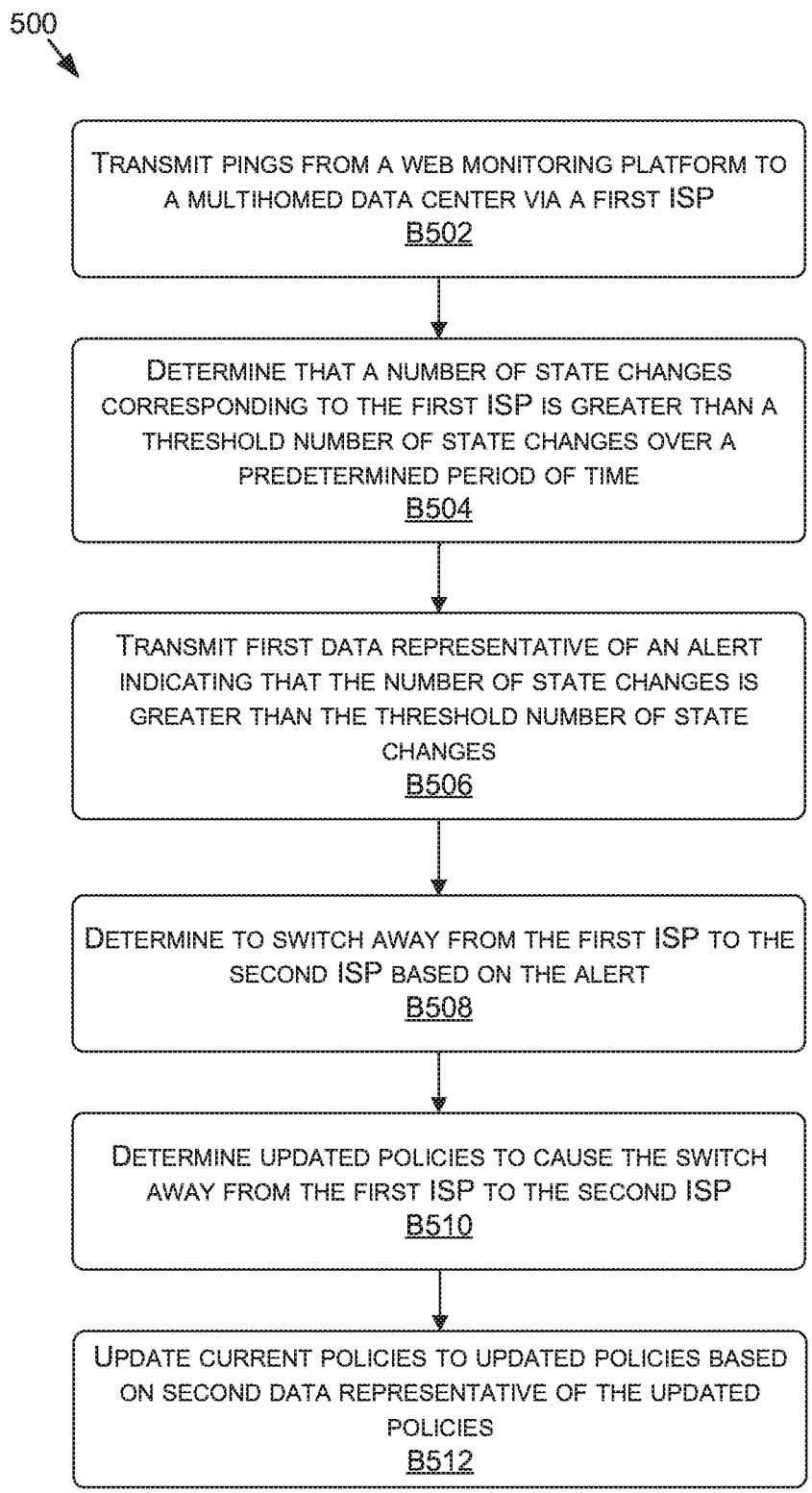
Figure 6:
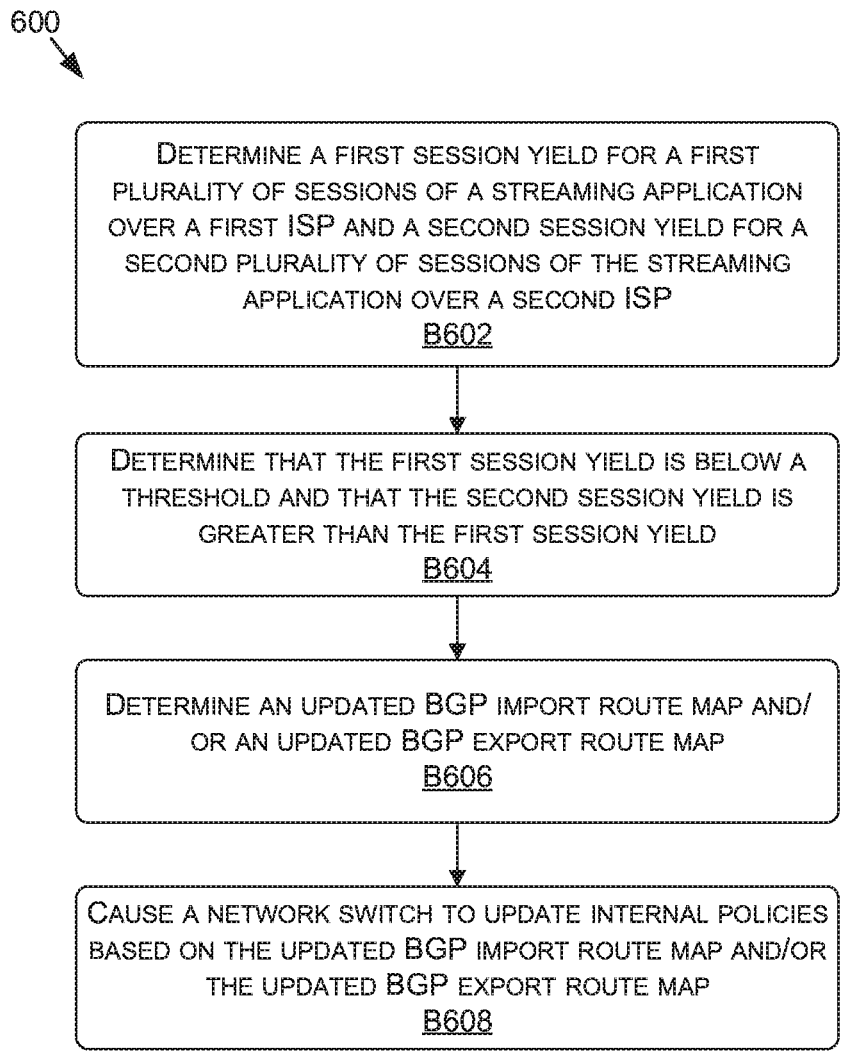
FIG. 6 is a flow diagram showing a method for updating network traffic routing based on monitored application performance parameters, in accordance with some embodiments of the present disclosure.

Now referring to FIGS. 4-6, each block of methods 400-600, described herein, comprises a computing process that may be performed using any combination of hardware, firmware, and/or software. For instance, various functions may be carried out by a processor executing instructions stored in memory. The methods 400-600 may also be embodied as computer-usable instructions stored on computer storage media. The methods 400-600 may be provided by a standalone application, a service or hosted service (standalone or in combination with another hosted service), or a plug-in to another product, to name a few. In addition, methods 400-600 is described, by way of example, with respect to the system 100 of FIG. 1. However, this method may additionally or alternatively be executed by any one system, or any combination of systems, including, but not limited to, those described herein.

Now referring to FIG. 4, FIG. 4 is a flow diagram showing a method 400 for updating network traffic routing based on monitored network performance parameters, in accordance with some embodiments of the present disclosure. The method 400, at block B402, includes transmitting a first test probe over a first network path via a first ISP and a second test probe over a second network path via a second ISP. For example, a first test probe may be transmitted over a network path including the transit ISP 110A and a second test probe may be transmitted over a network path including the transit ISP 110B.

The method 400, at block B404, includes analyzing first data representative of first quality metrics corresponding to the first network path and second quality metrics corresponding to the second network path. For example, network performance and/or application performance metrics may be monitored by the network monitor(s) 116 for network paths over the transit ISPs 110A and 110B and the network policy engine(s) 118 may analyze the data therefrom.

The method 400, at block B406, includes receiving second data representative of an alert indicating that the first network path is of higher quality than the second network path. For example, a network monitor 116 may generate an alert, and the network policy engine 118 may analyze the information from the alert corresponding to each network path to determine a first network path is better than a second network path.

The method 400, at block B408, includes determining to change a current network path including the second ISP to an updated network path including the first ISP. For example, the network policy engine(s) 118 may determine that policy updates should be implanted to switch the network paths.

The method 400, at block B410, includes determining updated policies for a network device(s). For example, the network configurator(s) 120 may determine the updates for the network device(s) 124—such as the core switches—to update the route maps.

The method 400, at block B412, includes transmitting third data representative of the updated policies to the network device(s). For example, the network configurator(s) 120 may transmit the policy updates to the network device(s) 124.

With reference to FIG. 5, FIG. 5 is a flow diagram showing a method 500 for updating network traffic routing based on monitored network performance parameters, in accordance with some embodiments of the present disclosure. The method 500, at block B502, includes transmitting pings from a web monitoring platform to a multihomed data center via a first ISP. For example, the network monitor(s) 116B may transmit pings to the transit ISP 110A.

The method 500, at block B504, includes determining that a number of state changes corresponding to the first ISP is greater than a threshold number of state changes over a predetermined period of time. For example, the network monitor(s) 116B may generate an alert based on the number of state changes exceeding a threshold over a period of time.

The method 500, at block B506, includes transmitting first data representative of an alert indicating that the number of state changes is greater than the threshold number of state changes. For example, the network monitor(s) may transmit the alert—e.g., in NPI data format—to the network policy engine(s) 118.

The method 500, at block B508, includes determining to switch away from the first ISP to the second ISP based on the alert. For example, the network policy engine(s) 118 may determine that a switch of transit ISPs 110 should be made.

The method 500, at block B510, includes determining updated policies to cause the switch away from the first ISP to the second ISP. For example, the network configurator(s) 120 may determine the updates that should be made at the network device(s) 124.

The method 500, at block B512, includes updating current policies to updated policies based on second data representative of the updated policies. For example, the updated policies may be pushed to the network device(s) 124 to cause the policies to be updated.

Now referring to FIG. 6, FIG. 6 is a flow diagram showing a method 600 for updating network traffic routing based on monitored application performance parameters, in accordance with some embodiments of the present disclosure. The method 600, at block B602, includes determining a first session yield for a first plurality of sessions of a streaming application over a first ISP and a second session yield for a second plurality of sessions of a streaming application over a second ISP. For example, a network monitor(s) 116 may determine session yields and/or numbers of sessions over network paths including different transit ISPs 110.

The method 600, at block B604, includes determining that the first session yield is below a threshold and that the second session yield is greater than the first session yield. For example, the network policy engine(s) 118 may determine, based on an alert from the network monitor(s) 116, that the session yield over a current transit ISP 110 is worse than a threshold and that the session yield over another transit ISP 110 is better.

The method 600, at block B606, includes determining an updated BGP import route map and/or an updated BGP export route map. For example, the network configurator(s) 120 may determine the updated BGP import route maps and/or the updated BGP export route maps to cause a switch to a better performing transit ISP 110.

The method 600, at block B608, includes causing a network switch to update internal policies based on the updated BGP import route map and/or the updated BGP export route map. For example, the network configurator(s) 120 may cause the network device(s) 124—e.g., a core switch(es)—to update internal policies.

Example Game Streaming System

Figure 7:
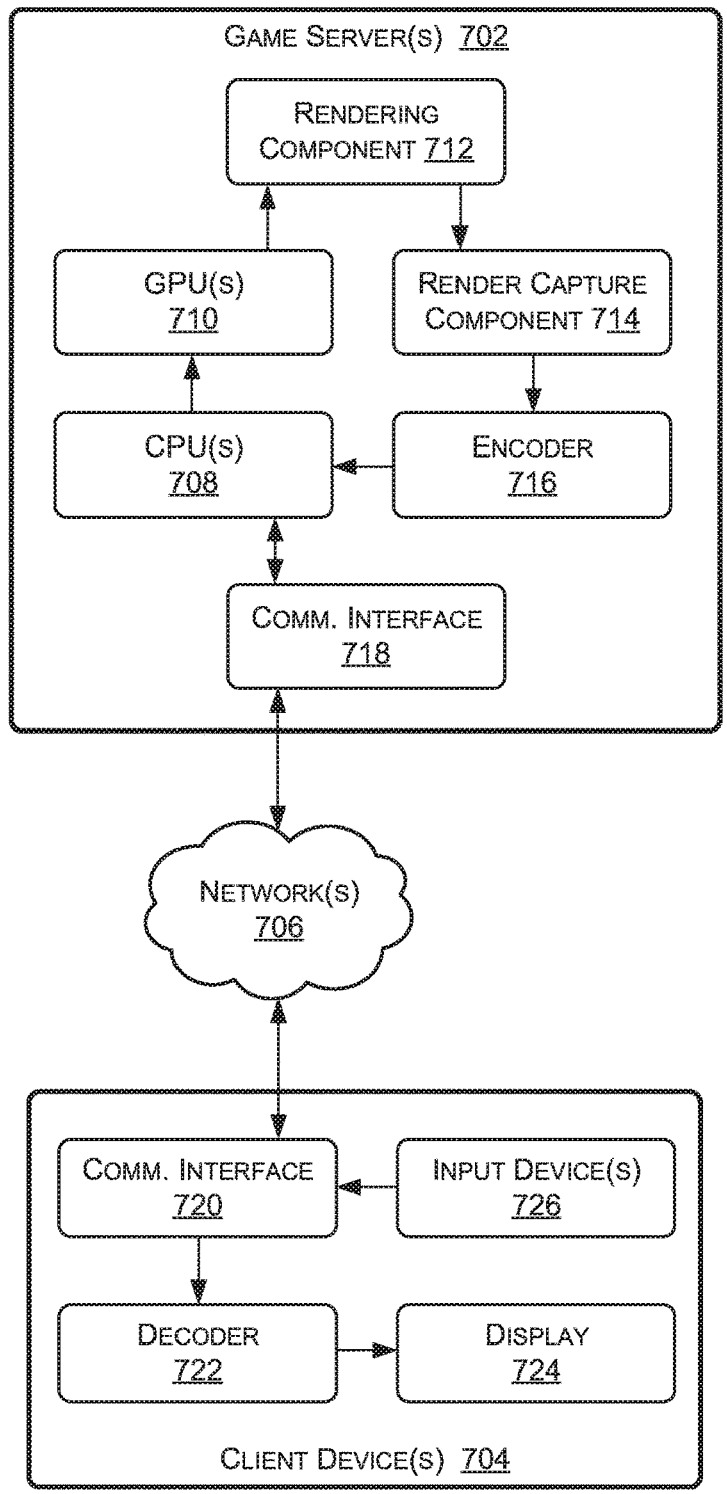
FIG. 7 is a block diagram of an example game streaming system suitable for use in implementing some embodiments of the present disclosure.

Now referring to FIG. 7, FIG. 7 is an example system diagram for a game streaming system 700, in accordance with some embodiments of the present disclosure. FIG. 7 includes game server(s) 702 (which may include similar components, features, and/or functionality to the example computing device 800 of FIG. 8), client device(s) 704 (which may include similar components, features, and/or functionality to the example computing device 800 of FIG. 8), and network(s) 706 (which may be similar to the network(s) described herein). In some embodiments of the present disclosure, the system 700 may be implemented.

In the system 700, for a game session, the client device(s) 704 may only receive input data in response to inputs to the input device(s), transmit the input data to the game server(s) 702, receive encoded display data from the game server(s) 702, and display the display data on the display 724. As such, the more computationally intense computing and processing is offloaded to the game server(s) 702 (e.g., rendering—in particular ray or path tracing—for graphical output of the game session is executed by the GPU(s) of the game server(s) 702). In other words, the game session is streamed to the client device(s) 704 from the game server(s) 702, thereby reducing the requirements of the client device(s) 704 for graphics processing and rendering.

For example, with respect to an instantiation of a game session, a client device 704 may be displaying a frame of the game session on the display 724 based on receiving the display data from the game server(s) 702. The client device 704 may receive an input to one of the input device(s) and generate input data in response. The client device 704 may transmit the input data to the game server(s) 702 via the communication interface 720 and over the network(s) 706 (e.g., the Internet), and the game server(s) 702 may receive the input data via the communication interface 718. The CPU(s) may receive the input data, process the input data, and transmit data to the GPU(s) that causes the GPU(s) to generate a rendering of the game session. For example, the input data may be representative of a movement of a character of the user in a game, firing a weapon, reloading, passing a ball, turning a vehicle, etc. The rendering component 712 may render the game session (e.g., representative of the result of the input data) and the render capture component 714 may capture the rendering of the game session as display data (e.g., as image data capturing the rendered frame of the game session). The rendering of the game session may include ray or path-traced lighting and/or shadow effects, computed using one or more parallel processing units—such as GPUs, which may further employ the use of one or more dedicated hardware accelerators or processing cores to perform ray or path-tracing techniques—of the game server(s) 702. The encoder 716 may then encode the display data to generate encoded display data and the encoded display data may be transmitted to the client device 704 over the network(s) 706 via the communication interface 718. The client device 704 may receive the encoded display data via the communication interface 720 and the decoder 722 may decode the encoded display data to generate the display data. The client device 704 may then display the display data via the display 724.

Example Computing Device

Figure 8:
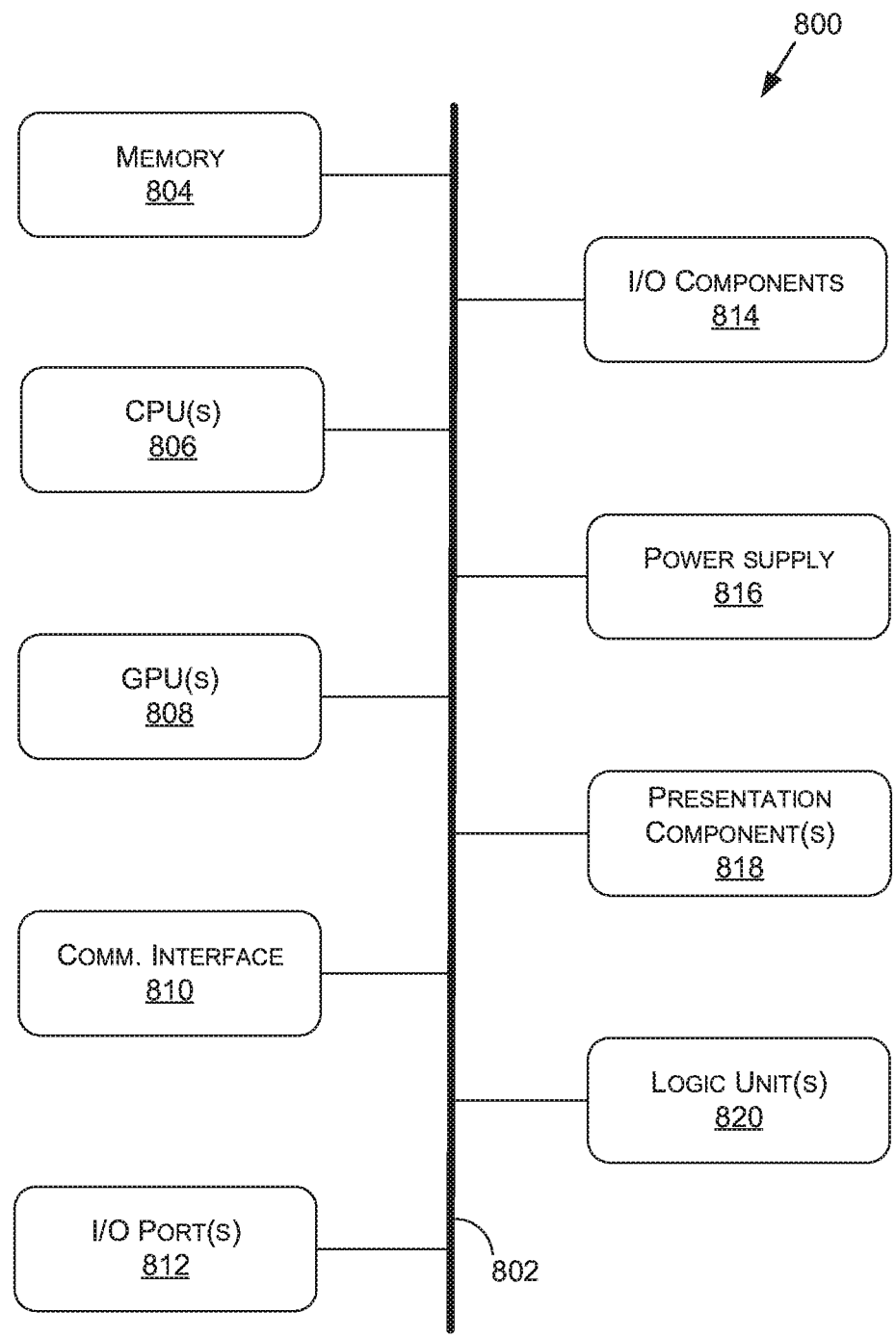
FIG. 8 is a block diagram of an example computing device suitable for use in implementing some embodiments of the present disclosure.

FIG. 8 is a block diagram of an example computing device(s) 800 suitable for use in implementing some embodiments of the present disclosure. Computing device 800 may include an interconnect system 802 that directly or indirectly couples the following devices: memory 804, one or more central processing units (CPUs) 806, one or more graphics processing units (GPUs) 808, a communication interface 810, input/output (I/O) ports 812, input/output components 814, a power supply 816, one or more presentation components 818 (e.g., display(s)), and one or more logic units 820.

Although the various blocks of FIG. 8 are shown as connected via the interconnect system 802 with lines, this is not intended to be limiting and is for clarity only. For example, in some embodiments, a presentation component 818, such as a display device, may be considered an I/O component 814 (e.g., if the display is a touch screen). As another example, the CPUs 806 and/or GPUs 808 may include memory (e.g., the memory 804 may be representative of a storage device in addition to the memory of the GPUs 808, the CPUs 806, and/or other components). In other words, the computing device of FIG. 8 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 8.

The interconnect system 802 may represent one or more links or busses, such as an address bus, a data bus, a control bus, or a combination thereof. The interconnect system 802 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 806 may be directly connected to the memory 804. Further, the CPU 806 may be directly connected to the GPU 808. Where there is direct, or point-to-point connection between components, the interconnect system 802 may include a PCIe link to carry out the connection. In these examples, a PCI bus need not be included in the computing device 800.

The memory 804 may include any of a variety of computer-readable media. The computer-readable media may be any available media that may be accessed by the computing device 800. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 804 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 800. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 806 may be configured to execute at least some of the computer-readable instructions to control one or more components of the computing device 800 to perform one or more of the methods and/or processes described herein. The CPU(s) 806 may each include one or more cores (e.g., one, two, four, eight, twenty-eight, seventy-two, etc.) that are capable of handling a multitude of software threads simultaneously. The CPU(s) 806 may include any type of processor, and may include different types of processors depending on the type of computing device 800 implemented (e.g., processors with fewer cores for mobile devices and processors with more cores for servers). For example, depending on the type of computing device 800, the processor may be an Advanced RISC Machines (ARM) processor implemented using Reduced Instruction Set Computing (RISC) or an x86 processor implemented using Complex Instruction Set Computing (CISC). The computing device 800 may include one or more CPUs 806 in addition to one or more microprocessors or supplementary co-processors, such as math co-processors.

In addition to or alternatively from the CPU(s) 806, the GPU(s) 808 may be configured to execute at least some of the computer-readable instructions to control one or more components of the computing device 800 to perform one or more of the methods and/or processes described herein. One or more of the GPU(s) 808 may be an integrated GPU (e.g., with one or more of the CPU(s) 806 and/or one or more of the GPU(s) 808 may be a discrete GPU. In embodiments, one or more of the GPU(s) 808 may be a coprocessor of one or more of the CPU(s) 806. The GPU(s) 808 may be used by the computing device 800 to render graphics (e.g., 3D graphics) or perform general purpose computations. For example, the GPU(s) 808 may be used for General-Purpose computing on GPUs (GPGPU). The GPU(s) 808 may include hundreds or thousands of cores that are capable of handling hundreds or thousands of software threads simultaneously. The GPU(s) 808 may generate pixel data for output images in response to rendering commands (e.g., rendering commands from the CPU(s) 806 received via a host interface). The GPU(s) 808 may include graphics memory, such as display memory, for storing pixel data or any other suitable data, such as GPGPU data. The display memory may be included as part of the memory 804. The GPU(s) 808 may include two or more GPUs operating in parallel (e.g., via a link). The link may directly connect the GPUs (e.g., using NVLINK) or may connect the GPUs through a switch (e.g., using NVSwitch). When combined together, each GPU 808 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 806 and/or the GPU(s) 808, the logic unit(s) 820 may be configured to execute at least some of the computer-readable instructions to control one or more components of the computing device 800 to perform one or more of the methods and/or processes described herein. In embodiments, the CPU(s) 806, the GPU(s) 808, and/or the logic unit(s) 820 may discretely or jointly perform any combination of the methods, processes and/or portions thereof. One or more of the logic units 820 may be part of and/or integrated in one or more of the CPU(s) 806 and/or the GPU(s) 808 and/or one or more of the logic units 820 may be discrete components or otherwise external to the CPU(s) 806 and/or the GPU(s) 808. In embodiments, one or more of the logic units 820 may be a coprocessor of one or more of the CPU(s) 806 and/or one or more of the GPU(s) 808.

Examples of the logic unit(s) 820 include one or more processing cores and/or components thereof, such as Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 810 may include one or more receivers, transmitters, and/or transceivers that enable the computing device 800 to communicate with other computing devices via an electronic communication network, included wired and/or wireless communications. The communication interface 810 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet.

The I/O ports 812 may enable the computing device 800 to be logically coupled to other devices including the I/O components 814, the presentation component(s) 818, and/or other components, some of which may be built in to (e.g., integrated in) the computing device 800. Illustrative I/O components 814 include a microphone, mouse, keyboard, joystick, game pad, game controller, satellite dish, scanner, printer, wireless device, etc. The I/O components 814 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 800. The computing device 800 may be include depth cameras, such as stereoscopic camera systems, infrared camera systems, RGB camera systems, touchscreen technology, and combinations of these, for gesture detection and recognition. Additionally, the computing device 800 may include accelerometers or gyroscopes (e.g., as part of an inertia measurement unit (IMU)) that enable detection of motion. In some examples, the output of the accelerometers or gyroscopes may be used by the computing device 800 to render immersive augmented reality or virtual reality.

The power supply 816 may include a hard-wired power supply, a battery power supply, or a combination thereof. The power supply 816 may provide power to the computing device 800 to enable the components of the computing device 800 to operate.

The presentation component(s) 818 may include a display (e.g., a monitor, a touch screen, a television screen, a heads-up-display (HUD), other display types, or a combination thereof), speakers, and/or other presentation components. The presentation component(s) 818 may receive data from other components (e.g., the GPU(s) 808, the CPU(s) 806, etc.), and output the data (e.g., as an image, video, sound, etc.).

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method comprising:
   transmitting, during a session of an application executing using one or more client devices and a data center, a first test probe over a first network path via a first internet service provider (ISP) of the data center and a second test probe over a second network path via a second ISP of the data center different from the first ISP, the first network path and the second network path coupling the data center with one or more support devices corresponding to the application;
   analyzing, using monitoring agents executing in the data center and the one or more support devices, first data representative of first quality metrics corresponding to the first network path and second data representative of second quality metrics corresponding to the second network path;
   determining, using a network policy engine and based at least in part on a comparison between the first and second data, to change a current network path including the second ISP to an updated network path including the first ISP;
  determining, using a network configurator, updated policies for one or more core switches of the data center to cause the current network path to switch to the updated network path; and
  transmitting third data representative of the updated policies to the one or more core switches.

2. The method of claim 1, wherein the transmitting the first test probe over the first network path via the first ISP and the second test probe over the second network path via the second ISP is based at least in part on edge switch network routing configurations and internet protocol (IP) differentiated services code point (DSCP) parameters.

3. The method of claim 1, wherein the first quality metrics and the second quality metrics each correspond to one or more of loss, latency, or jitter.

4. The method of claim 3, wherein a weighted average of one or more of the loss, the latency, or the jitter is computed for each of the first network path and the second network path, and an alert is generated based at least in part on comparing the weighted average for each of the first network path and the second network path.

5. The method of claim 3, wherein a weighted average of one or more of the loss, the latency, or the jitter is computed for each of the first network path and the second network path, wherein the loss is more heavily weighted than the jitter, and the jitter is more heavily weighted than the latency.

6. The method of claim 1, wherein the network policy engine and the network configurator are executed at least in part in the data center.

7. The method of claim 1, wherein the transmitting the first test probe over the first network path via the first ISP and the second test probe over the second network path via the second ISP is executed at least in part using a border gateway protocol (BGP).

8. The method of claim 1, further comprising:
  receiving a number of alerts above a threshold number of alerts over a predetermined period of time, each alert of the number of alerts being generated based at least in part on one of the second ISP performing better than the first ISP or the first ISP performing better than the second ISP; and
  ignoring additional alerts after alerts of the number of alerts to avoid dampening by one or more of the first ISP or the second ISP.

9. The method of claim 8, further comprising, after a threshold period of time from receiving an alert without receiving an additional alert corresponding to the second ISP, reverting to another network path including the second ISP.

10. The method of claim 1, wherein the monitoring agents are at least one of:
  plugins;
  application-specific; or
  instantiations of containerized applications.

11. The method of claim 1, wherein at least one of the monitoring agents, the network policy engine, or the network configurator correspond to instantiations of containerized applications.

12. A system comprising:
  a web monitoring agent to:
    transmit pings from a web monitoring platform to a multihomed data center via a first internet service provider (ISP) of the multihomed data center;
    determine, based at least in part on the pings, that a number of state changes corresponding to the first ISP is greater than a threshold number of state changes over a predetermined period of time; and
    transmit first data representative of an alert indicating that the number of state changes is greater than the threshold number of state changes over the predetermined period of time;
  a network policy engine to:
    receive the first data; and
    determine, based at least on part on the alert, to switch away from the first ISP to a second ISP of the multihomed data center;
  a network configurator to:
    determine updated policies to cause the switch away from the first ISP to the second ISP; and
    transmit second data representative of the updated policies; and
  one or more core switches of the multihomed data center to:
    receive the second data; and
    update current policies to the updated policies based at least in part on the second data.

13. The system of claim 12, wherein the network policy engine and the network configurator are executed in the multihomed data center.

14. The system of claim 12, wherein the web monitoring agent is executed using one or more computing devices remotely located with respect to the multihomed data center, further wherein the pings are transmitted from the one or more computing devices via one or more intermediate autonomous systems prior to reaching an autonomous system of the first ISP.

15. The system of claim 12, wherein the updated policies cause at least one of current import route maps to be changed to updated import route maps or current export route maps to be changed to updated export route maps.

16. The system of claim 15, wherein the updated export route maps are generated by prepending one or more autonomous system paths to a border gateway protocol (BGP) header.

17. The system of claim 12, wherein the web monitoring agent, the network policy engine, and the network configurator correspond to instantiations of containerized applications.

18. The system of claim 12, wherein the web monitoring agent is at least one of:
  a plugin;
  application-specific; or
  an instantiation of a containerized application.

19. The system of claim 12, wherein at least one of the web monitoring agent, the network policy engine, or the network configurator correspond to instantiations of containerized applications.

20. A method comprising:
  determining, using a monitoring agent plugin and over a period of time, a first session yield for a first plurality of sessions of a streaming application over a first internet service provider (ISP) and a second session yield for a second plurality of sessions of the streaming application over a second ISP;
  determining, using the monitoring agent plugin, that the first session yield is below a threshold and that the second session yield is greater than the first session yield;
  determining, using a network policy plugin and based at least in part on the first session yield being below the threshold and the second session yield being greater than the first session yield, at least one of an updated border gateway protocol (BGP) import route map or an updated BGP export route map; and causing, using a network configurator plugin, a network switch to update internal policies based at least in part on at least one of the updated BGP import route map or the updated BGP export route map.

21. The method of claim 20, wherein the streaming application is a cloud gaming application, and the monitoring agent plugin, the network policy plugin, and the network configurator plugin are executed in a data center hosting the cloud gaming application.

22. The method of claim 20, wherein the determining the updated export BGP route map causes the network switch to prepend one or more autonomous system paths to a BGP header.

23. The method of claim 20, wherein the determining at least one of the updated border gateway protocol (BGP) import route map or the updated BGP export route map is further based at least in part on the second session yield being greater than another threshold.

24. The method of claim 20, wherein the monitoring agent plugin, the network policy plugin, and the network configurator plugin correspond to instantiations of containerized applications executing in a data center hosting, at least in part, the first plurality of sessions and the second plurality of sessions.

25. The method of claim 20, wherein the determining, using the monitoring agent plugin, the first session yield and the second session yield includes transmitting application-specific data corresponding to the streaming application over the Internet using the first ISP and the second ISP.

26. The method of claim 20, wherein at least one of the monitoring agent plugin, the network policy plugin, or the network configurator plugin correspond to instantiations of a containerized applications.

* * * * *